US007888280B2

United States Patent
Ebert et al.

(10) Patent No.: US 7,888,280 B2
(45) Date of Patent: Feb. 15, 2011

(54) IMMOBILIZED HOMOGENEOUS CATALYSTS

(75) Inventors: Katrin Ebert, Lüneburg (DE); Detlev Fritsch, Reinbek (DE); Herbert Plenio, Bensheim (DE); Gisela Bengston, Hamburg (DE)

(73) Assignee: GKSS-Forschungszentrum Geesthacht GmbH (DE)

( * ) Notice: Subject to any disclaimer, the term of this patent is extended or adjusted under 35 U.S.C. 154(b) by 190 days.

(21) Appl. No.: 12/178,248

(22) Filed: Jul. 23, 2008

(65) Prior Publication Data

US 2009/0029849 A1 Jan. 29, 2009

(30) Foreign Application Priority Data

Jul. 27, 2007 (EP) ................. 07 014 768

(51) Int. Cl.
*B01J 31/00* (2006.01)
(52) U.S. Cl. .................................... 502/159
(58) Field of Classification Search ................ 502/159, 502/350, 349, 232, 355
See application file for complete search history.

(56) References Cited

U.S. PATENT DOCUMENTS 6,695,992 B2 * 2/2004 Reneker .................... 264/29.1
6,916,758 B2    7/2005 Reneker et al.

FOREIGN PATENT DOCUMENTS

EP        0629441  A1    12/1994
WO    20070024634  A1    3/2007

OTHER PUBLICATIONS

Gilhespy, Michelle et al., Polymer-supported nitroxyl radical catalysts for the hypochlorite and aerobic oxidation of alcohols; Catalysis Today 117, Jun. 19, 2006, pp. 114-119.
Stasiak, Michael et al., Design of polymer nanofiber systems for the immobilization of homogeneous catalysts—Preparation and leaching studies, Polymer 48, Jul. 17, 2007, pp. 5208-5218.
Stasiak, Michael et al., Polymer Fibers as Carriers for Homogeneous Catalysts; Chemistry, A European Journal, 2007, pp. 6150-6156.
Guo, Chao et al., Nanofibers of polyethylene produced by SBA-15 supported zirconium catalyst [N-(3-tert-butylsalicylidene)-4'-allyloxylanilinato]2Zr(IV)Cl2; Journal of Catalysis, Aug. 10, 2005, pp. 356-363.
Stasiak, M. et al., Immobilization of the Homogeneous Catalyst Trans-4-hydroxyproline in Electrospun Nanofibers; pp. 91-92.
Kragl, Udo, et al., Membrane Reactors in Homogeneous Catalysis; Applied Homogeneous Catalysis with Organometallic Compounds, 2nd edition, p. 832-843, Wlley-VCH.
Konigsberger, Kurt, A Practical Synthesis of 6-[2-(2,5-Dimethoxyphenyl)ethyl]-4-ethylquinazoline and the Art of Removing Palladium from the Products of Pd-Catalyzed Reactions, Organic Process Research & Development; vol. 7, No. 5, 2003.
European Search Report for EP07014768, dated Dec. 27, 2007.

* cited by examiner

*Primary Examiner*—Melvin C Mayes
*Assistant Examiner*—Melissa Stalder
(74) *Attorney, Agent, or Firm*—Michaud-Kinney Group LLP

(57) ABSTRACT

A catalyst is produced by bonding a homogeneous catalyst to the surface of a catalyst support. A catalyst may include a catalyst support, a spacer molecule bonded to the catalyst support, and a homogeneous catalyst bonded to the spacer molecule. A catalyzed reaction can be carried out by providing reactants in a first phase and providing a catalyst as described herein in the first phase.

25 Claims, No Drawings

IMMOBILIZED HOMOGENEOUS CATALYSTS

CROSS-REFERENCE TO RELATED APPLICATION

This application claims the priority of European application number EP 07 014 768.1, filed Jul. 27, 2007, which is hereby incorporated herein by reference, in its entirety.

FIELD OF THE INVENTION

The invention relates to a method for the production of a supported homogeneous catalyst, which is used in homogeneous catalytic reactions, to a supported homogeneous catalyst and to the use of a supported homogeneous catalyst.

BACKGROUND

In the case of homogeneous catalysis, a catalyst is located in the same phase or in the same aggregate state as the reactants, e.g., together with the reactants in a fluid or as a gas intermixed with reactant gases.

For some homogenously catalyzed synthesis reactions, catalysts are used that contain precious metal, such as platinum, palladium and rhodium, and ligands specially tailored for synthesis. The relatively high costs for such catalysts are caused both by the contained precious metals and the most difficulty synthesized ligands. The costs of the ligands can exceed the value of the precious metal.

During the reaction, the homogeneous catalyst is present dissolved in the reaction solution. After the reaction is complete, processing is required in order to separate and then reclaim the catalyst from the product and non-converted reactant and to be able to feed it to a new reaction cycle if applicable. The processing takes place for example through a thin film evaporation, which is relatively complicated and represents a thermal load on the catalyst.

The separation of the catalyst through a membrane process is being researched and tested as a new method. For this, solvent-stable membranes must be available that have a very high retention rate (>99%) at a high flow rate, in order to ensure an economical procedure.

All methods for processing homogeneous catalysts result in losses of precious metals and ligands (i.e., loss of catalyst), since a complete separation of the catalyst from the unreacted reactants and from the reaction product is not possible. The occurring catalyst losses must be compensated for the following reaction cycle through the addition of a new catalyst and represent a considerable cost factor in addition to the complicated separation.

Up until now, homogeneous catalysts are available dissolved in the reaction solution. After the reaction is complete, the catalyst (precious metal and ligand) must be separated from the reaction mixture (products and reactants). Technically, this occurs through thermal separation procedures, e.g. thin film vaporizer, multi-phase catalysis or adsorptive removal of the heavy metal catalysts (Königsberger et al. Org. Proc. Res. Dev. 2003, 7, 733).

One technique currently being researched is the separation of the catalysts with solvent-stable membranes (U. Kragl, C. Deisbach, "Membrane Reactors in Homogeneous catalysis". in "Applied homogeneous catalysis with organometallic Compounds", B. Cornils, W. A. Herrmann (eds.), 2. edition, 941-952, 2002, Wiley-VCH).

Complete reclamation of the catalyst is not achieved in either of the procedures. Moreover, the processing is an additional work step, which creates personnel and energy costs.

RELATED ART

Reneker et al. describe in U.S. Pat. No. 6,916,758 B2 the simultaneous spinning of polymer and aluminum fibers, wherein the aluminum fibers work as a catalyst. A large portion of the fibers are contained in the fiber interior and is thus not available for catalytic reactions.

Stasiak et al. describe the immobilization of a homogeneous catalyst (Proceedings of Chemical Nanotechnology Talks VII: Status and future of nanofibers by electrospinning. Dechema e.V., 91-92 (2006)). In this case, the catalyst was covalently bonded to a styrol oligomer. This catalyst oligomer system was processed into nanofibers together with polystyrol by electrospinning. The washing out of the catalyst into the surrounding solvent was able to be limited because the styrol oligomer has a higher solubility in the surrounding polystyrol matrix than in the solvent.

Processing for the separation of the catalyst after the reaction is still required with this type of performance of homogeneously catalyzed reactions. This can take place with different methods. However, a complete reclamation of the homogeneous catalyst cannot be achieved.

SUMMARY

The present invention resides in one aspect in a method for the production of a catalyst. According to this method, a homogeneous catalyst is bonded to the surface of a catalyst support.

The invention resides in another aspect to a catalyst that includes a catalyst support, a spacer molecule bonded to the catalyst support, and a homogeneous catalyst bonded to the spacer molecule.

The invention resides in yet another aspect in a method for carrying out a catalyzed reaction. The method includes providing reactants in a first phase and providing a catalyst as described herein in the first phase.

DETAILED DESCRIPTION OF THE INVENTION

The present invention provides a method for making a supported homogeneous catalyst that is useful in homogeneous catalysis. The method involves bonding one or more homogeneous catalysts to a catalyst support. In various embodiments, the one or more homogeneous catalysts are bonded to the support in a moveable but immobilized manner.

In some embodiments, a homogeneous catalyst is bonded to the surface of the catalyst support using an interconnecting spacer molecule. The spacer molecule is bonded to the surface of the catalyst support and to the ligand(s) of the homogeneous catalyst.

In other embodiments, a homogeneous catalyst is bonded to the surface of the catalyst support without an intervening spacer molecule.

One aspect of the invention provides that the catalyst support may be insoluble in a catalyst solution. In another aspect of the invention, the catalyst support may be a solid material having macro-sized dimensions.

In one embodiment, the homogeneous catalyst is arranged mainly in a freely moveable manner on one end of a spacer molecule having at least two ends. The spacer molecule has one end bonded to the surface of the catalyst support, while the end opposite from the catalyst support is bonded to the homogeneous catalyst.

In another embodiment, one or more homogeneous catalysts are bonded directly to the catalyst support, i.e., without use of a spacer molecule. For example, the one or more homogeneous catalysts may be bonded to the surface of an insoluble catalyst support. Optionally, a plurality of homogeneous catalysts may be bonded to a catalyst support concurrently, e.g., simultaneously.

In accordance with one aspect of the invention, a heterogenized supported homogeneous catalyst is provided wherein one or more homogeneous catalysts are bonded to the surface of an insoluble base body in the form of a catalyst support, without the homogeneous catalysts being integrated into the catalyst support. For example, the homogeneous catalyst may be bonded to smooth or non-micro porous surface of a catalyst support. When the heterogenized homogeneous catalyst is disposed in a reaction solution, the homogeneous catalyst is present in a dissolved state, while the catalyst support is present permanently or insolubly in the reaction solution. The heterogenized homogeneous catalysts are thereby circulated with the reaction solution in generally the same way as an unsupported homogeneous catalyst.

The homogeneous catalysts of this invention may be chosen for selective syntheses and an easy separability or easy processing and good reusability. The homogeneous catalysts are immobilized on the catalyst support through the covalent or adsorptive bonding of the homogeneous catalysts by spacer molecules. One end of a spacer molecule is bound to the homogeneous catalyst and another end of the spacer molecule is bonded to the catalyst support. Optionally, the spacer molecule may be bound to a planar or curved, outer surface of a catalyst support.

In certain embodiments, the homogeneous catalyst has a ligand according to the preferred synthesis with a precious metal. For example, platinum, palladium or rhodium are used as precious metals or precious metal atoms for the ligand. Above all, the properties of the homogeneous catalysts can be adjusted via the ligands coordinated on the metal center or metal complex. In such embodiments, the ligands in particular are bonded in a freely movable manner to the surface of the catalyst support. For example, the ligands are bonded to spacer molecules through covalent or adsorptive bonding. In this way, the free moveability of the catalysts bonded to the surface of the medium is retained, whereby conversions and selectivity of the homogeneous solution of the homogeneous catalysts are achieved.

In order to create a reaction, the produced supported homogeneous catalyst with its homogeneous catalysts that are freely moveable in the half space and the homogeneous catalysts is circulated or passed through the reaction solution so that the supported homogeneous catalyst according to the invention is circulated or passed through almost freely without resistance and the reactants hereby come in contact with the homogeneous catalysts moveably immobilized on the surface of the catalyst support, whereby the reaction proceeds as in the case of the homogenous catalysis of unbound catalysts.

The term "half space" in this context is to be understood as the part of the space not occupied by the catalyst support. In this "half space" the homogenous catalyst which is bonded to the surface of the catalyst support is free to move, for example in a rotating or swaying movement, thereby exhibiting its catalyzing activity, while being fixed to the surface of the catalyst support.

Moreover, the problem of the contamination of the reaction products with catalyst residue is drastically reduced with the immobilization of the catalyst complexes or the ligands or the homogeneous catalysts. For example, for the production of pharmacologically active products, strict limit values in the ppm range apply for the contamination with heavy metals.

In one particular embodiment, the catalyst support is designed in the form of a fleece. The fleece may optionally be produced from a plurality of fibers.

In order to achieve a high catalyst density, it is provided according to a further embodiment that the homogeneous catalysts are moveably immobilized on the non-porous or non-microporous, in particular even, surface of the catalyst support.

This causes the catalyst support to have a high ratio of surface to volume so that homogeneous catalyst can be bonded thereto with at a high catalyst density. The catalyst quantity per volume in the catalyst support is hereby increased considerably compared to a non-porous catalyst support. High conversion rates without loss of selectivity are achieved through the increased surface of the catalyst support, e.g. a fleece made of (nano) fibers, per volume as well as through good accessibility of the catalyst on the outer surface, for example by even, non-porous (nano) fibers in the fleece.

Preferably, electrospun fibers or threads, in particular even nano fibers, are preferably used as catalyst support, which are processed into fleece. This creates a high surface for the bonding of the catalyst, preferably via the ligand, to the catalyst support. The catalyst is thus bonded to the fibers or their surface but is present overall freely on the surface of the catalyst support and is thus easily accessible for the reactants of a reaction solution.

A heterogenation of the homogeneous catalyst is achieved through the immobilization on the catalyst supports in the form of a fleece. The homogeneous catalysts according to the invention are accessible through the immobilization on the surface of a catalyst support distributed in the surface during the flow through of a reaction solution directly and without pressure loss as in the previously known homogeneous catalysis procedure. Instead of stirring in a kettle or container, the reaction solution is pumped through a fleece with catalysts in circulation until the desired conversion is achieved. High conversions of the reaction solution without loss of selectivity and activity loss of the homogeneous catalyst are achieved through the high surface of the catalyst fleece per volume, which enables good accessibility of the catalyst on the exterior surface of even, non-porous nano fibers in the fleece.

Moreover, it is advantageous if the homogeneous catalysts are bonded in an immobilized manner to the surface of the catalyst support or the spacer molecules by a covalent or adsorptive bond.

The immobilization of the catalysts on the catalyst support surface preferably takes place through covalent bonding between the functional groups or spacer molecule of the catalyst ligands and the surface of the medium fibers in the fleece. These functional groups or spacer molecule groups can thereby be achieved in the medium polymer of the catalyst support but also through the admixture of other minerals, e.g. siloxanes, or also through a surface modification, e.g. plasma treatment.

In particular, the catalyst support, to the surface of which the homogeneous catalysts are bonded, is provided as preferably solid or permanent particles, film or fibers that are insoluble in the reaction solution, which have in particular a solid surface. The catalyst support is hereby present in non-molecular or macroscopic form, i.e. the catalyst support is present in a size which is bigger by one or more orders of magnitude than the molecularly present homogeneous catalysts and spacer molecule groups, so that the macroscopically designed catalyst support also has a continuous, solid or even surface, to which the homogeneous catalysts are bonded.

The catalyst support can be present in the form of particles for the formation of a homogeneous catalyst. Moreover, films or fibers can also be used as the catalyst support. Overall, it is important that the catalyst support has a high ratio of surface to volume, in order to achieve a high catalyst density. The catalyst supports are preferably made from coal, $TiO_2$, $ZrO_2$, $SiO_2$, $Al_2O_3$ and mixtures of these. The catalyst support also may be made from other inorganic materials.

Moreover, organic or organic/inorganic polymer materials can also be used for the catalyst support, such as polyacrylnitrile, polyvinylidene fluoride, polyacrylnitrile co-glycidyl methacrylate, polyamide-imide, polyimide, polyamide, polystyrol, polydimethylsiloxane. These materials are preferably processed with corresponding methods from the molten mass and/or from the solution.

Furthermore, according to a preferred embodiment, the catalyst support, to the surface of which the homogeneous catalysts are bonded, is provided as fleece from several fibers, in particular nano fibers.

In particular, the fleece is or will be provided or produced as a catalyst support from fibers with diameters less than about 100 micromenters ($\mu m$), preferably less than about 10 $\mu m$, even more preferably less than about 1 $\mu m$.

Preferably, the fleece is or will be provided or produced from fibers, which are also called nano fibers, with diameters of about 5 nanometers (nm) to about 500 nm, in particular about 20 nm to about 200 nm. The production of very thin fibers with thickness in the nanometer range are of particular interest for the production of supported homogeneous catalysts or modules, since the ratio of surface to thread volume increases proportionally with a decreasing thickness. For example, 1 cubic centimetres ($cm^3$) of support material can comprise fibers having a thickness of 2000 $\mu m$ with a surface area of 10 square centimetres ($cm^2$); 1 $cm^3$ of support material can comprise fibers with a thickness of 2 $\mu m$ and a surface area of 1 square meter ($m^2$), or 1 $cm^3$ of support material can comprise fibers having a thickness of 0.02 $\mu m$ (=20 nm) and a surface area of 100 $m^2$.

Moreover, it is suggested in a preferred embodiment of the method that the fibers of the fleece are or will be produced according to the electrospinning procedure. Correspondingly suitable fibers are hereby provided in the nanometer range, whereby the fibers produced through electrospinning are usually processed into fleece, the fiber diameter of which lies below 1 $\mu m$. In particular, larger diameters of the fleece fibers are also possible.

Preferred diameters of fibers, which are produced through electrospinning, are 20 nm to 200 nm. Fibers are produced in an electric field through the treatment e.g. of polymer solutions, wherein the polymer solution is dosed to an electrode and removed and accelerated by the predominant field of the electrode, so that the polymer solution is split into small fibers in the nanometer range (diameter), which attach to the counter-electrode to a fleece.

Moreover, the invention relates to a supported homogeneous catalyst, wherein homogeneous catalysts are bonded in an immobilized manner, in particular moveably to the, in particular planar or curved, surface of a catalyst support of an, in particular solid, surface such that a.) the homogeneous catalysts are bonded to the surface of the catalyst support using or interconnecting a spacer molecule so that the spacer molecule bonded to the surface of the catalyst support is designed between the surface of the catalyst support and the ligand(s) of the homogeneous catalysts, whereby the homogeneous catalysts are located on the side opposite the surface of the catalyst support or in the half space opposite the surface of the catalyst support; or b.) the homogeneous catalysts are bonded to the surface of the catalyst support without the use or interconnection of a spacer molecule, whereby the homogeneous catalysts are located on the side opposite the surface of the catalyst support or in the half space opposite the surface of the catalyst support; or c.) the homogeneous catalysts are bonded to the surface of the catalyst support with the use or interconnection of a spacer molecule, whereby the homogeneous catalysts are located on the side opposite the surface of the catalyst support or in the half space opposite the surface of the catalyst support.

The homogeneous catalysts are hereby moveably immobilized on the non-porous or non-microporous, in particular even, surface of the catalyst support. In particular, the homogeneous catalysts are bonded in an immobilized manner through a covalent or adsorptive bonding to the surface of the catalyst support.

Moreover, the supported homogeneous catalyst is characterized in that the catalyst support, to the surface of which the homogeneous catalysts are bonded, is or will be provided as particles, film or fibers, in particular nano fibers. Preferably, the catalyst support, to the surface of which the homogeneous catalysts are bonded, is or will be provided as fleece made of several fibers, in particular nano fibers.

Preferably, the fleece is or will be provided or produced from fibers with diameters less than about 100 $\mu m$, preferably less than about 10 $\mu m$, even more preferably less than about 1 $\mu m$. Preferably, the fleece is or will be provided or produced from fibers with diameters of about 5 nm to about 500 nm, in particular about 20 nm to about 200 nm.

Moreover, it is advantageous for the supported homogeneous catalyst if the fibers of the fleece are or will be produced according to the electrospinning procedure.

It is provided in accordance with one embodiment of the supported homogeneous catalyst that the catalyst support is or will be made of an inorganic material, in particular coal, $TiO_2$, $ZrO_2$, $SiO_2$, $Al_2O_3$ or a mixture of these. Furthermore, the catalyst support is or will be made of organic polymer material or organic/inorganic polymer material.

Preferably, the catalyst support is insoluble in reaction solutions in which the homogeneous catalyst is active.

Moreover, the invention relates to a method for carrying out a catalyzed reaction, comprising:

providing reactants in a first phase; and providing a catalyst according to the invention in the first phase.

Preferably, the first phase is a liquid phase, the method comprising providing reactants dissolved in liquid solution, and adding the catalyst to the liquid solution.

Preferably, the catalyst comprises a catalyst support in the form or fleece.

In another embodiment, the homogeneous catalyst is bound to the catalyst support in a movable and immobilized manner, and wherein the homogenous catalyst is located on the side opposite the catalyst support or in the half space opposite the surface of the catalyst support.

Preferably, the homogenous catalyst is soluble in the liquid phase and the catalyst support insoluble in the liquid phase.

Through the provision of supported, heterogenized homogeneous catalysts according to the invention to a support device, it is achieved that a homogeneous catalyst module is achieved without loss of ligands and without activity loss, which can be used in several reaction cycles. In particular, covalently bonded ligands are no longer lost in a nanoscale fleece medium. Losses of precious metals due to finite complex formation constants can be offset during recycling through new addition.

The catalysts immobilized on the surface of the catalyst support are bonded due to the covalent bond and are nonetheless freely moveable in the reaction solution, whereby the same conversions and selectivities are also achieved as for an unbonded homogeneous catalyst.

Through the immobilization of the catalysts on the catalyst support, a complicated and inefficient separation of the catalysts from the reaction mixture (i.e., from the reactants and products) after the reaction is complete is unnecessary and may be avoided. In addition, the washing of the catalysts out of the medium is avoided through the covalent bonding of the catalysts to the catalyst support.

The (homogeneous) catalysts are bonded to the surface of the catalyst support, wherein all catalyst molecules are freely accessible for the reaction. A high catalyst density can be realized on the surface of the medium when selecting a corresponding catalyst support with a high aspect ratio (ratio of surface to volume), e.g. in the form of nano fibers or nanoparticles. Thus, efficient and cost-effective reactions are possible using homogeneous catalysts.

The terms "a" and "an" herein do not denote a limitation of quantity, but rather denote the presence of at least one of the referenced item. Further, the term "about" includes the precise value to which it refers but indicates optionally allowance for customary variance normally assumed in the art for values of the stated kind.

Although the invention has been described with reference to particular embodiments thereof, it will be understood by one of ordinary skill in the art, upon a reading and understanding of the foregoing disclosure that numerous variations and alterations to the disclosed embodiments will fall within the scope of this invention and of the appended claims.

What is claimed is:

1. A method for the production of a catalyst, comprising bonding a homogeneous catalyst comprising a ligand to surface of a non-porous catalyst support through a covalent bond, the non-porous catalyst support comprises a non-porous or a non-microporous surface and a fleece made of a plurality of fibers having a diameter less than 1 µm.

2. The method of claim 1, wherein the fleece comprises fibers with diameters of about 5 nm to about 500 nm.

3. The method of claim 1, wherein the fleece comprises fibers produced in an electrospinning procedure.

4. The method of claim 1, wherein the catalyst support comprises coal, $TiO_2$, $ZrO_2$, $SiO_2$, $Al_2O_3$, or a mixture thereof.

5. The method of claim 1, wherein the catalyst support comprises an organic polymer material, an organic/inorganic polymer material or a combination thereof.

6. The method of claim 1, comprising binding a spacer molecule to the surface of the catalyst support and bonding the homogeneous catalyst to the spacer molecule.

7. The method of claim 6, comprising binding the ligand to the spacer molecule.

8. The method of claim 1, wherein the catalyst support is insoluble in a medium in which the homogeneous catalyst is soluble and effective for catalyzing a reaction.

9. The method of claim 1, comprising binding the homogeneous catalyst to catalyst supporting a moveable and immobilized manner, and wherein the homogeneous catalyst is located on the side opposite the catalyst support or in the half space opposite the surface of the catalyst support.

10. A catalyst comprising
  a non-porous catalyst support comprising a non-porous or a non-microporous surface and a fleece made of a plurality of fibers having a diameter less than 1 µm; and
  a homogeneous catalyst bonded to the non-porous catalyst support through a covalent bond, wherein the homogeneous catalyst comprises a ligand.

11. The catalyst of claim 10, wherein a spacer molecule is bonded to the catalyst support and the homogenous catalyst is bonded to the spacer molecule.

12. The catalyst of claim 11, wherein the ligand is bonded to the spacer molecule.

13. The catalyst of claim 10, wherein the homogeneous catalyst is bonded to the non-porous or non-microporous surface of the non-porous catalyst support.

14. The catalyst of claim 10, wherein the fleece comprises fibers with diameters of about 5 nm to about 500 nm.

15. The catalyst of claim 10, wherein the catalyst support comprises fibers produced by an electrospinning procedure.

16. The catalyst of claim 10, wherein the catalyst support comprises coal, $TiO_2$, $ZrO_2$, $SiO_2$, $Al_2O_3$, or a mixture thereof.

17. The catalyst of claim 10, wherein the catalyst support comprises an organic polymer material or organic/inorganic polymer material.

18. The catalyst of claim 10, made according to the method of claim 1.

19. The catalyst of claim 10, wherein the catalyst support is insoluble in a medium in which the homogeneous catalyst is soluble and effective for catalyzing a reaction.

20. The catalyst of claim 10, wherein the homogeneous catalyst is bound to the catalyst support in a moveable and immobilized manner, and wherein the homogeneous catalyst is located on the side opposite the catalyst support or in the half space opposite the surface of the catalyst support.

21. A method for carrying out a catalyzed reaction, comprising
  providing reactants in a first phase; and
  providing a catalyst according to claim 10 in the first phase.

22. The method of claim 21, wherein the first phase is a liquid phase, the method comprising providing reactants dissolved in liquid solution, and adding the catalyst to the liquid solution.

23. The method of claim 22, wherein the catalyst comprises a catalyst support in the form of fleece.

24. The method of claim 21, wherein the homogeneous catalyst is bound to the catalyst support in a moveable and immobilized manner, and wherein the homogeneous catalyst is located on the side opposite the catalyst support or in the half space opposite the surface of the catalyst support.

25. The method of claim 22, wherein the homogeneous catalyst is soluble in the liquid phase and the catalyst support is insoluble in the liquid phase.

* * * * *